May 28, 1968 R. L. WATTERS 3,386,085

TELEMETERING PROTECTION CIRCUIT

Filed Oct. 22, 1965

Inventor:
Robert L. Watters,
by Marvin Snyder
His Attorney.

United States Patent Office 3,386,085

Patented May 28, 1968

3,386,085
TELEMETERING PROTECTION CIRCUIT

Robert L. Watters, Schenectady, N.Y., assignor to General Electric Company, a corporation of New York Filed Oct. 22, 1965, Ser. No. 502,110
6 Claims. (Cl. 340—185)

This invention relates to telemetering systems, and more particularly to circuits for protecting telemetering systems against failure due to short-circuits in the monitoring networks.

In a system requiring remote monitoring, it is frequently desirable that the system functions be maintained when a short circuit develops in the monitor, or wires leading to the monitor. Disruption in operation of the telemetering system can result in existence of undetected dangerous conditions, or expensive, time-consuming shutdowns. The invention described herein permits unaltered functioning of a telemetering system, even when one or more remote monitoring networks becomes short-circuited, by preventing the short-circuit from affecting the remainder of the telemetering system and the operative monitoring networks.

Accordingly, one object of the invention is to provide a protection circuit for a telemetering system wherein a short-circuit in one or more monitoring networks of the system leaves the functioning of the remaining monitoring networks undisturbed.

Another object is to provide a system for operating meters in a parallel circuit configuration wherein a short-circuit in one or more of the meters leaves the condition of the remaining meters unaffected.

Another object is to provide an electronic metering circuit which provides accurate indication of the functioning of a monitored system on properly-operating meters in the system despite short-circuits appearing in other meters in the system.

Another object is to provide apparatus for monitoring a system which permits the system to operate and perform its prime function even though one or more external monitors in the apparatus are short-circuited.

Briefly stated, the invention contemplates a telemetering system comprising a plurality of transistors, each transistor having a base, a collector and an emitter. Means are provided for biasing the collectors of the transistors to a predetermined potential of one polarity. The bases of the transistors are connected to a common input voltage source to be monitored. The emitter of each transistor is connected respectively through impedance means to a predetermined potential of opposite polarity, and indicating means are connected from the emitter of each transistor respectively to ground. In this fashion, voltage across each said indicating means is always maintained at the opposite polarity with respect to ground.

Figure 1:
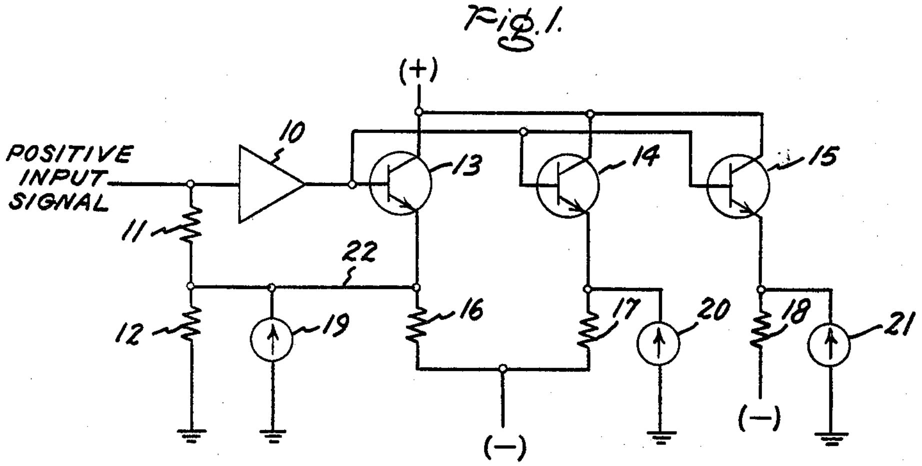
Figure 2:
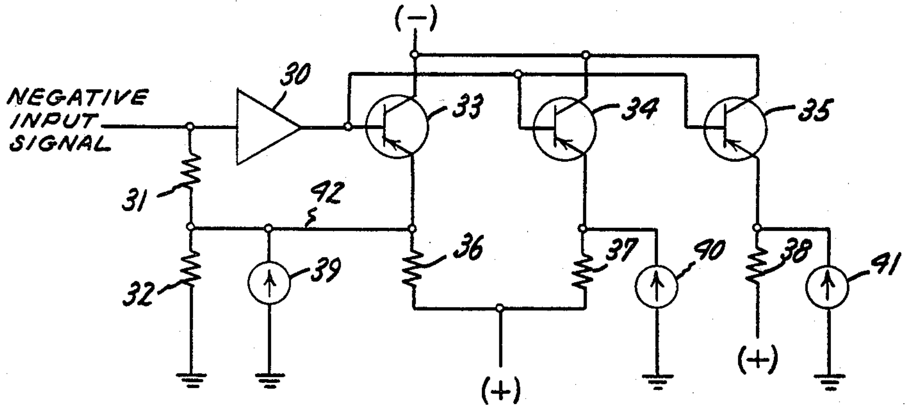

The features of the invention believed to be novel are set forth with particularity in the appended claims. The invention itself, however, both as to organization and method of operation, together with further objects and advantages thereof, may best be understood by reference to the following description taken in conjunction with the accompanying drawings in which:

FIGURE 1 is a schematic diagram of a circuit embodying the invention for metering positive input voltages; and FIGURE 2 is a schematic diagram of a circuit embodying the invention for metering negative input voltages.

In FIGURE 1, a high gain inverting amplifier 10 receives at its input positive signals which are developed across a pair of series-connected resistances 11 and 12. Output voltage from amplifier 10 is supplied between the respective bases and emitters of a plurality of N-P-N transistors 13, 14 and 15. Although for illustrative purposes only three transistors are shown, it should be understood that any required number may be utilized. Positive potential is applied to the collector of each of the transistors, and negative potential is applied to the emitters of each of transistors 13, 14 and 15 through resistances 16, 17 and 18, respectively. Negative feedback, for stability purposes, is supplied to the input of amplifier 10 through a lead 22 connecting the emitter of transistor 13 to the junction common to resistances 11 and 12. Indication meters 19, 20 and 21, which may be voltmeters, are connected respectively to the emitters of transistors 13, 14 and 15. The other side of each of the meters is grounded.

In operation, with no input voltage applied to the circuit, lead 22 is maintained at ground potential. Positive input voltage to amplifier 10 is developed across resistances 11 and 12. The amplifier inverts the polarity of applied input voltage, so as to supply negative voltage to the bases of each of transistors 13, 14 and 15. Because this negative voltage, however, is of insufficient amplitude to drive the bases negative with respect to the emitters, transistors 13, 14 and 15 operate as emitter follower amplifiers, and the emitter voltage which is of negative polarity, is indicated by meters 19, 20 and 21, respectively.

Because telemetering systems may be required to operate under various adverse circumstances, the meters or connections thereto may become short-circuited to ground, due to breakdown of insulation, for example. For illustrative purposes, assume that meter 20 becomes short-circuited. In such condition, the reading on meter 20 is zero. However, the emitter of transistor 14 is now connected to ground through the short-circuited meter, so that the base potential is negative with respect to the emitter. Hence, transistor 14 is rendered non-conductive, so that the base potential is negative with respect to the emitter. Hence, transistor 14 is rendered non-conductive, so that the short-circuited condition of meter 20 has no effect upon any of the other metering circuits in the telemetering system. The same condition would apply in the event the emitter of transistor 14 were directly short-circuited to ground.

FIGURE 2 is an illustration of a telemetering system for use where monitoring of negative voltages is required. Thus, negative voltage which is developed across a pair of series-connected resistances 31 and 32 is supplied to the input of a high gain, inverting amplifier 30, and positive output voltage is supplied to the bases of a plurality of P-N-P transistors 33, 34 and 35, from the output of amplifier 30. The collectors of transistors 33, 34 and 35 are biased to a negative potential, and positive potential is applied to the emitters of transistors 33, 34 and 35 through resistances 36, 37 and 38, respectively. Negative feedback, for stability purposes, is supplied to the input of amplifier 30 from the emitter of transistor 33 through a feedback lead 42 connected to the junction common to resistances 31 and 32. Indication meters 39, 40 and 41, which may be voltmeters, are connected respectively to the emitters of transistors 33, 34 and 35. The other side of each of meters 39, 40 and 41 is grounded.

Operation of the circuit of FIGURE 2 is similar to operation of the circuit of FIGURE 1. Thus, with no input voltage applied to the circuit, lead 42 is maintained at ground potential. Positive voltages are supplied to the bases of transistors 33, 34 and 35, from the output of inverting amplifier 30. Because these positive voltages, however, are of insufficient amplitude to drive the bases positive with respect to the emitters, transistors 33, 34 and 35 operate as emitter follower amplifiers. Accordingly, meters 39, 40 and 41 provide indication of the emitter voltage, which is of positive polarity.

If meter 40 is supplied with current through a long lead or monitoring network, this network is quite susceptible to short-circuits to ground due to breakdown of insulation anywhere along its length. In the event such short-circuit occurs, the emitter of transistor 34 is immediately grounded, and the reading on meter 40 falls to zero. Because the potential supplied to the base of transistor 34 is positive with respect to ground, transistor 34 is rendered non-conductive, thus preventing excessively large currents from flowing therethrough. In this fashion, the readings on meters 39 and 41 remain unaffected by the short circuit in the monitoring network for meter 40.

In both the circuits of FIGURES 1 and 2, it is assumed that the connections to meters 19 and 39 are sufficiently short so as to minimize the possibility of a short-circuit to ground occurring across these meters. If such is not the case, however, an additional transistor may be connected to the output of the high gain inverting amplifier for the sole purpose of supplying the stabilizing feedback current to the input of the amplifier. In such case, no meter would be connected between the emitter of this transistor and ground.

The foregoing describes a telemetering system which is protected against total failure due to short-circuits in the monitoring networks. The system enables those properly-operating meters which are connected in a parallel circuit configuration to provide accurate indication of the functioning of the monitored apparatus despite short-circuits appearing in other meters or monitoring networks in the system.

While only certain preferred features of the invention have been shown by way of illustration, many modifications and changes will occur to those skilled in the art. It is, therefore, to be understood that the appended claims are intended to cover all such modifications and changes as fall within the true spirit and scope of the invention.

What I claim as new and desire to secure by Letters Patent of the United States is:

1. A telemetering system comprising: a plurality of transistors, each transistor having a base, a collector and an emitter; means biasing the collectors of said transistors to a predetermined potential of one polarity; means coupling the bases of said transistors to a common source of input voltage to be monitored; circuit means coupling the emitter of each transistor respectively to a predetermined potential of opposite polarity; and indicating means coupling the emitter of each transistor respectively to ground so that voltage across each said indicating means is maintained at said opposite polarity with respect to ground.

2. The telemetering system of claim 1 wherein each of said transistors is of the N-P-N type, said potential of one polarity is positive, and said potential of opposite polarity is negative.

3. The telemetering system of claim 1 wherein each of said transistors is of the P-N-P type, said potential of one polarity is negative, and said potential of opposite polarity is positive.

4. The telemetering system of claim 1 including an inverting amplifier having an input and output, wherein said output comprises said common input voltage source; and feedback means coupling the emitter of one of said transistors to the input of said inverting amplifier.

5. The telemetering system of claim 2 including an inverting amplifier having an input and an output, wherein said output comprises said common input voltage source; and feedback means coupling the emitter of one of said N-P-N transistors to the input of said inverting amplifier.

6. The telemetering system of claim 3 including an inverting amplifier having an input and an output, wherein said output comprises said common input voltage source; and feedback means coupling the emitter of one of said P-N-P transistors to the input of said inverting amplifier.

No references cited.

THOMAS B. HABECKER, *Primary Examiner.*